United States Patent
Grayson et al.

(10) Patent No.: US 11,483,395 B2
(45) Date of Patent: *Oct. 25, 2022

(54) WIRELESS EVENT CORRELATION USING ANONYMOUS DATA

(71) Applicant: Cisco Technology, Inc., San Jose, CA (US)

(72) Inventors: Mark Grayson, Berkshire (GB); Jerome Henry, Pittsboro, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 8 days.

This patent is subject to a terminal disclaimer.

(21) Appl. No.: 17/130,324

(22) Filed: Dec. 22, 2020

(65) Prior Publication Data
US 2021/0112126 A1    Apr. 15, 2021

Related U.S. Application Data

(63) Continuation of application No. 16/178,123, filed on Nov. 1, 2018, now Pat. No. 10,931,760.

(51) Int. Cl.
*H04L 67/146* (2022.01)
*H04L 67/141* (2022.01)

(52) U.S. Cl.
CPC .......... *H04L 67/141* (2013.01); *H04L 67/146* (2013.01)

(58) Field of Classification Search
None
See application file for complete search history.

(56) References Cited

U.S. PATENT DOCUMENTS

| 8,848,721 | B2 | 9/2014 | Tapio et al. |
| 9,135,598 | B2 | 9/2015 | Ferraro |
| 9,619,482 | B1 | 4/2017 | Kathari et al. |
| 2005/0005121 | A1 | 1/2005 | Chen et al. |
| 2006/0168253 | A1 | 7/2006 | Baba et al. |

(Continued)

OTHER PUBLICATIONS

Stefan Winter, "Report on F-Ticks," RESTENA Foundation, Sep. 2010, pp. 1-6, available at https://www.terena.org/activities/tf-mobility/meetings/22/tf-mobility-fticks-copenhagen-2010.pdf.

(Continued)

*Primary Examiner* — Joshua Joo

(57) ABSTRACT

In one embodiment, a method includes: transmitting a message to a first end point that includes an instruction to initiate a communication type, wherein the communication type includes sharing a randomization token between the first and second end points; obtaining a first communication report from the first end point and a second communication report from the second end point in response to initialization of a communication based on the communication type between the first end point and the second end point across the network, wherein the first and second communication reports respectively include a first and second hash that corresponds to a function of the randomization token and identity information; determining whether the first hash matches the second hash; generating a value that correlates the first and second end points with the communication across the network in response to determining that the first hash matches the second hash.

20 Claims, 7 Drawing Sheets

(56) References Cited

U.S. PATENT DOCUMENTS

| | | | |
|---|---|---|---|
| 2007/0286376 A1* | 12/2007 | Maximo | H04L 63/083 379/201.01 |
| 2007/0294224 A1* | 12/2007 | Heler | G06F 9/466 |
| 2011/0196868 A1 | 8/2011 | Hans et al. | |
| 2014/0012916 A1 | 1/2014 | van Ham et al. | |
| 2015/0067328 A1* | 3/2015 | Yin | H04L 63/0807 713/168 |
| 2016/0241540 A1 | 8/2016 | Jeffrey et al. | |
| 2020/0126106 A1 | 4/2020 | Winner | |
| 2020/0177649 A1 | 6/2020 | Shang et al. | |
| 2020/0267189 A1* | 8/2020 | Senatore | H04L 63/0428 |

OTHER PUBLICATIONS

Johansson et al., "F-Ticks—A Federated Log Format," Internet Engineering Task Force (IETF), Internet-Draft, Oct. 2013, pp. 1-6, available at https://tools.ietf.org/html/draft-johansson-fticks-00.

Stefan Winter, "eduroam: Dynamic IdP Discovery," RESTENA Foundation, May 2010, pp. 1-17, available at https://geant3.archive.geant.org/Media_Centre/Media_Library/Media%20Library/JRA3-T1-idp-discovery.pdf.

GitHub, Inc., "radiator-fticks-anonymizer", https://github.com/stockholmuniversity/radiator-fticks-anonymizer, Jun. 13, 2013, 2 pages.

GitHub, Inc., "radiator-fticks-anonymizer", https://github.com/stockholmuniversity/radiator-fticks-anonymizer/blob/master/fticks_anonymizer, Jun. 10, 2013, 3 pages.

H. Tschofenig, Ed. et al., "Carrying Location Objects in Radius and Diameter", Network Working Group, Request for Comments: 5580, Category: Standards Track, Aug. 2009, 53 pages.

International Search Report and Written Opinion in counterpart International Application No. PCT/US2019/058030, dated Jan. 29, 2020, 16 pages.

Ljubica Pajevic, "Revisiting the modeling of user association patterns in a university wireless network", Published in: 2018 IEEE Wireless Communications and Networking Conference (WCNC), Apr. 2018, 6 pages.

L. Johansson, Ed., "F-Ticks—A Federation Log Format", Internet Engineering Task Force, Internet-Draft, Intended status: Informational, https://tools.ietf.org/html/draft-johansson-fticks-00, Oct. 3, 2013, 5 pages.

K. Wierenga, "The eduroam Architecture for Network Roaming", Independent Submission, Request for Comments: 7593, Category: Informational, ISSN: 2070-1721, https://tools.ietf.org/html/rfc7593, Sep. 2015, 37 pages.

Eduroam, "How does eduroam work?", https://www.eduroam.org/how/, downloaded Jan. 17, 2020, 2 pages.

* cited by examiner

WIRELESS EVENT CORRELATION USING ANONYMOUS DATA

CROSS-REFERENCE TO RELATED APPLICATION

This application is a continuation of and claims the benefit of priority to U.S. patent application Ser. No. 16/178,123, filed Nov. 1, 2018, and issued on Feb. 23, 2021 as U.S. Pat. No. 10,931,760, the entire contents of which are incorporated herein by reference.

TECHNICAL FIELD

The present disclosure generally relates to wireless event correlation and, in particular, to systems, methods, and devices for concealing identity information while retaining an ability to trace end point identity information from anonymized communication reports.

BACKGROUND

Public networks often make trade-offs when balancing privacy and traceability. To this end, a network operator (e.g., a cloud federation or core network operator) supplies a network that links two end points (e.g., an access provider and an identity provider). The network operator may have a legal responsibility to respond to law enforcement inquires while also having a competing data privacy responsibility (e.g., General Data Privacy Regulation (GDPR)). Fulfilling both of these responsibilities at the same time is a problem for the network operator.

BRIEF DESCRIPTION OF THE DRAWINGS

So that the present disclosure can be understood by those of ordinary skill in the art, a more detailed description may be had by reference to aspects of some illustrative embodiments, some of which are shown in the accompanying drawings.

Figure 1:
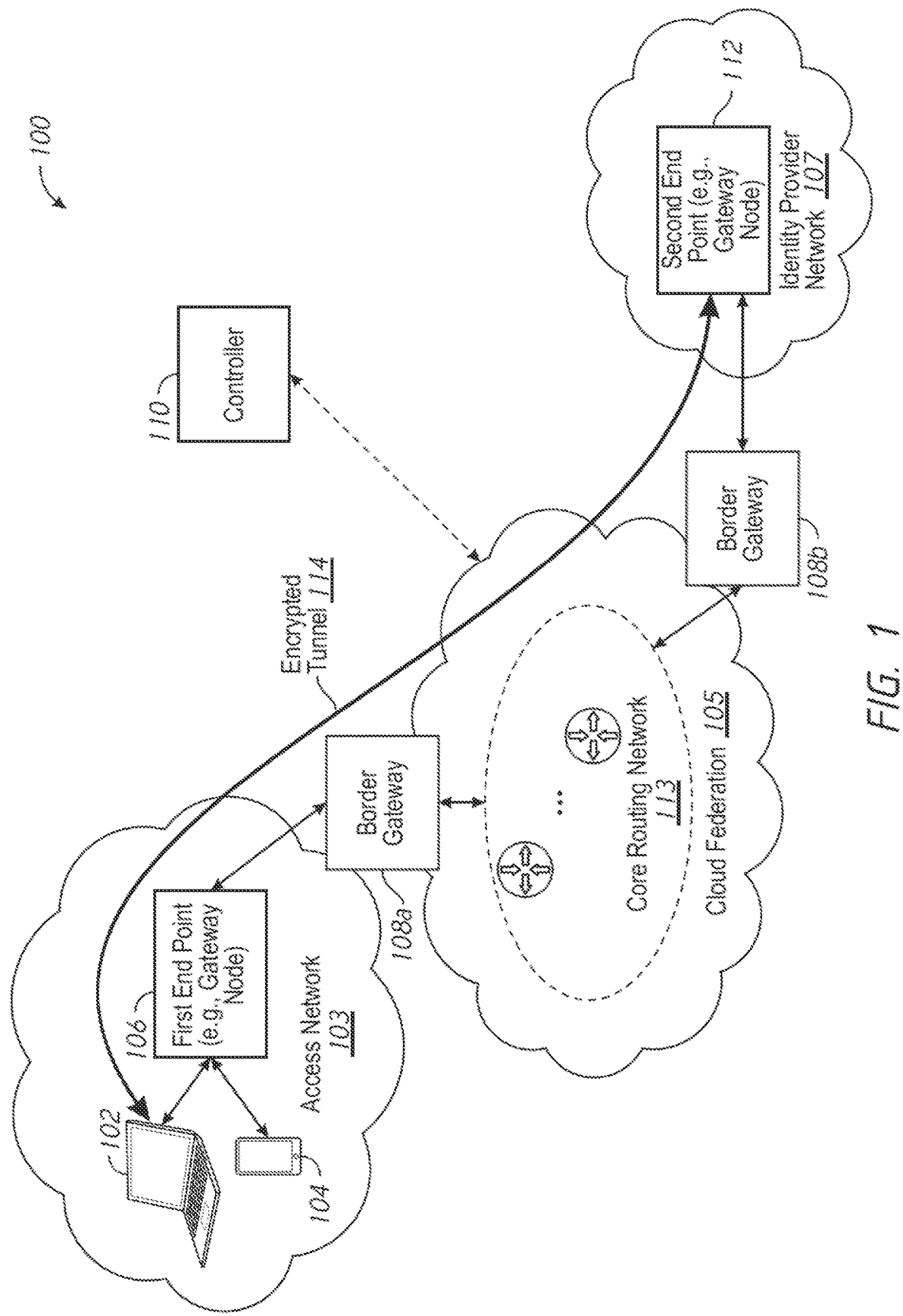
FIG. 1 is block diagram of an example network environment in accordance with some embodiments.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the illustrative embodiments shown in the accompanying drawings. However, the accompanying drawings merely show some example aspects of the present disclosure and are therefore not to be considered limiting. Those of ordinary skill in the art will appreciate from the present disclosure that other effective aspects and/or variants do not include all of the specific details of the example embodiments described herein. While pertinent features are shown and described, those of ordinary skill in the art will appreciate from the present disclosure that various other features, including well-known systems, methods, components, devices and circuits have not been illustrated or described in exhaustive detail for the sake of brevity and so as not to obscure more pertinent aspects of the example embodiments described herein.

Overview

Various embodiments disclosed herein include methods, devices, and systems for concealing identity information while having an ability to trace end point identity information from anonymized communication reports. For example, in various embodiments, a method is performed by a network controller, including one or more processors and non-transitory memory, that manages network connectivity between a first end point and a second end point. In various embodiments, the method includes transmitting a message to the first end point that includes an instruction to initiate a communication type when the first end point communicates with the second end point across a network, wherein the communication type includes sharing a randomization token between the first end point and the second end point. The method includes obtaining a first communication report from the first end point in response to initialization of a communication based on the communication type between the first end point and the second end point across the network, wherein the first communication report includes a first hash that corresponds to a function of the randomization token and identity information. The method further includes obtaining a second communication report from the second end point in response to the initialization of the communication based on the communication type between the first end point and the second end point across the network, wherein the second communication report includes a second hash that corresponds to the function of the randomization token and the identity information. The method further includes determining whether the first hash matches the second hash. The method further includes generating a value that correlates the first end point and second end point with the communication across the network in response to determining that the first hash matches the second hash. In accordance with some embodiments, the network controller includes one or more processors and a non-transitory memory.

In accordance with some embodiments, a device includes one or more processors, a non-transitory memory, and one or more programs; the one or more programs are stored in the non-transitory memory, which, when executed by the one or more processors, cause the device to perform or cause performance of any of the methods described herein. In accordance with some embodiments, a non-transitory memory has stored therein instructions, which, when executed by one or more processors of a device, cause the device to perform or cause performance of any of the methods described herein. In accordance with some embodiments, a device includes: one or more processors, a non-transitory memory, and means for performing or causing performance of any of the methods described herein.

EXAMPLE EMBODIMENTS

Some embodiments allow a network operator to remain neutral and still retain the ability to correlate anonymous communication reports that are independently generated by two end points. Each of the two end points generate an anonymous respective communication report using a shared randomization token and then generate a hash value that is a function of the shared randomization token and end point identity information. As a result, the network operator can trace end point identity information by comparing hash values from the anonymized communication reports.

FIG. 1 illustrates an example network architecture 100 in accordance with some embodiments. While pertinent features are shown, those of ordinary skill in the art will appreciate from the present disclosure that various other features have not been illustrated for the sake of brevity and so as not to obscure more pertinent aspects of the example embodiments disclosed herein. To that end, the example network architecture includes an access network 103 that includes at least a first user device 102, a second user device 104, and a first end point 106 (e.g., a gateway node), a cloud federation 105 that includes at least two border gateways (e.g., a border gateway 108a and a border gateway 108b) and a core routing network 113, a network controller 110, and an identity provider network 107 that includes at least a second end point 112 (e.g., a gateway node).

In some embodiments, the access network 103 corresponds to an access provider (e.g., a public Wi-Fi hotspot or the like) that provides access to the Internet or some other network to the first user device 102 and the second user device 104. The access provider has visibility into the Media Access Control (MAC) address and Internet protocol (IP) address activity associated with the first user device 102 and the second user device 104. In some embodiments, for privacy reasons, the access network 103 tracks user device identities (e.g., MAC or IP addresses) at the scale of individual sessions but does not track user device identities from one session to the next.

The first user device 102 or the second user device 104 may be any suitable type of device, such as a cellular telephone, a smart phone, a tablet device, a laptop device, an Internet of Things (IoT) device, or the like.

In some embodiments, the identity provider network 107 corresponds to an identity authentication or single-sign on (SSO) provider (e.g., a social media platform, an SSO platform, or the like) that, for example, authenticates the users of the first user device 102 or the second user device 104 based on existing login credentials prior to gaining access to the access network 103.

The first end point 106 (e.g., a gateway node associated with the access network 103) and the second end point 112 (e.g., a gateway node associated with the identity provider network 107) are each provided as a single entity (e.g., a server, a virtual machine, etc.) In some embodiments, the first end point 106 and the second end point 112 correspond to gateway devices, routers, managed switches, unmanaged switches, hubs, bridges, access points, or a suitable combination thereof. In some embodiments, the first end point 106 and the second end point 112 are implemented as a distributed system including a suitable combination of software, data structures, virtual machines, computing devices, servers, switches, and routers. For the sake of brevity and convenience, the first end point 106 and the second end point 112 are each described herein as a single entity.

As shown in FIG. 1, the first end point 106 associated with the access network 103 is connected to the border gateway 108a associated with the cloud federation 105. Similarly, the second end point 112 associated with the identity provider network 107 is connected to the border gateway 108b associated with the cloud federation 105. A person of ordinary skill in the art would appreciate that although FIG. 1 shows a first end point 106 associated with access network 103 and the second end point 112 associated with the identity provider network 107, the end points can be situated within other types of networks. Accordingly, the cloud federation can also be replaced with other intermediary networks and/or backbones in various other embodiments.

As shown in FIG. 1, the cloud federation 105 includes the border gateway 108a, the border gateway 108b, and a core routing network 113 (e.g., a plurality of routers, switches, hubs, and/or the like). In accordance with some embodiments, a network controller 110 is connected to the cloud federation 105. In some embodiments, the cloud federation 105 corresponds to a neutral cloud federation that acts as an intermediary between the first end point 106 and the second end point 112. The cloud federation 105 acts as a link between the first end point 106 and the second end point 112, but should not be involved in user device identification or tracking. Otherwise, the cloud federation 105 may become caught in a liability chain and may start having to keep track of a multiplicity of identifiers for users, locations, and the like. In addition, the cloud federation 105 may need to comply with General Data Protection Regulation (GDPR) requirements. The GDPR corresponds to a set a legal structure applicable in multiple areas (e.g., most European countries) that makes an important distinction around handling pseudonymous versus anonymous identifies. In this context, the cloud federation 105 may become potentially liable, as the cloud federation 105 may know or be able to derive unique identifiers for each user.

FIG. 1 also illustrates an encrypted tunnel 114 as being a conceptually separate communication channel connecting the first user device 102 to the second end point 112. In some embodiments, the encrypted tunnel 114 utilizes portions of the access network 103, the cloud federation 105, and the identity provider network 107.

Figure 2A:
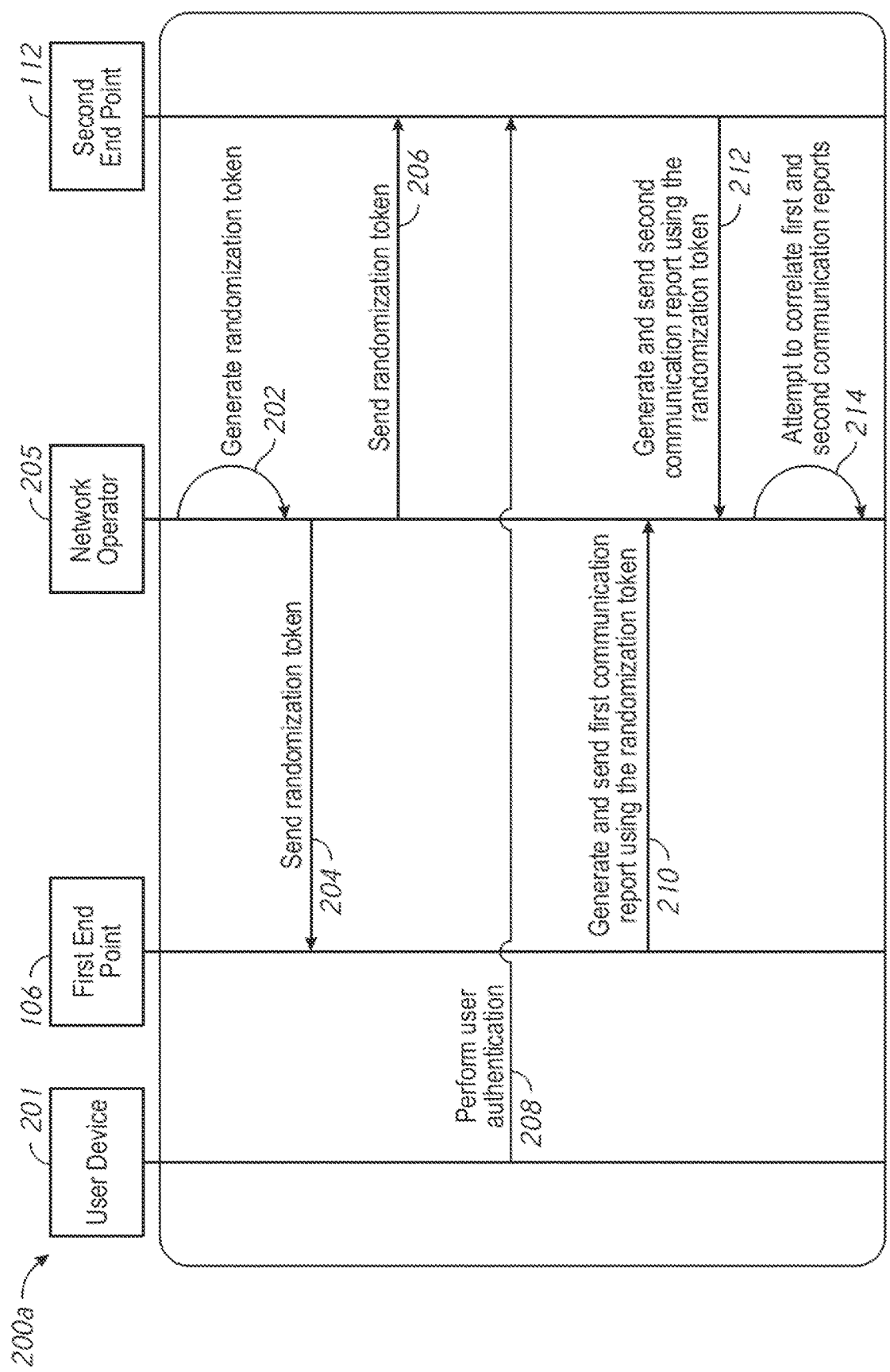
FIG. 2A is a process flow diagram that illustrates an approach for generating communication reports using coordinated randomization tokens in accordance with some embodiments.

FIG. 2A depicts a process flow 200a implemented by a system for generating communication reports using coordinated randomization tokens in accordance with some embodiments. As an option, one or more instances of the process flow 200a or any aspect thereof may be implemented in the context of the architecture and functionality of the embodiments described herein. Also, the process flow 200a or any aspect thereof may be implemented in any desired environment. In some embodiments, a user device 201, a first end point 106, a network operator 205, and a second end point 112 exhibit a set of high-level interactions (e.g., operations, messages, etc.) as shown in the process flow 200a in FIG. 2.

In some embodiments, as represented by operation 202, the network operator 205 generates a randomization token. In some embodiments, the network operator 205 corresponds to a cloud federation or a network controller (e.g., the network controller 110 shown in FIG. 1) therefor. In some embodiments, the randomization token corresponds to a security token. In some embodiments, the randomization token corresponds to a randomization value that is colloquially referred to as a "salt" value. In some embodiments, the salt value is a random or pseudo-random value that is used as an additional input to a one-way function (e.g., a cryptographic hash function such as MD5, SHA-1, SHA-2, SHA-3, or the like) that hashes data, a password, or passphrases. As such, salt values are used to safeguard passwords in storage because a new salt value is randomly generated for each password. For example, the salt value and the password are concatenated and processed with a cryptographic hash function, and the resulting output (but not the password) is stored with the salt in a database.

In some embodiments, as represented by operation 204, the network operator 205 sends the randomization token to the first end point 106. In some embodiments, the first end point 106 corresponds to an access provider such as a retailer that provides a Wi-Fi hotspot.

In some embodiments, as represented by operation 206, the network operator 205 sends the randomization token to the second end point 112. In some embodiments, the second end point 112 corresponds to an identity provider such as a social media platform, an SSO platform, or the like.

In some embodiments, as represented by operation 208, the user device 201 authenticates a user identity with the second end point 112. For example, a user may use the user device 201 to log into his/her social media account using pre-existing login credentials, and the user is, in turn, authenticated by the social media platform (e.g., associated with the second end point 112).

In some embodiments, as represented by operation 210, the first end point 106 generates a first communication report using the randomization token and sends the first communication report to the network operator 205. In some embodiments, the first communication report includes a first hash that corresponds to a function of the randomization token and identity information.

In some embodiments, as represented by operation 212, the second end point 112 generates a second communication report using the same randomization token as the first end point 106 and sends the second communication report to the network operator 205. In some embodiments, the second communication report includes a second hash that corresponds to a function of the randomization token and identity information.

In some embodiments, as represented by operation 214, the network operator 205 attempts to correlate the first and second communication reports by comparing the hashes therein. The network operator 205 is able to correlate the first and second communication reports because the first and second hashes match due to the usage of the same randomization token provided by the network operator 205 to the first end point 106 and the second end point 112. However, the network operator 205 is able to derive the identity information because the network operator 205 generated the randomization token and provided the randomization token to the first end point 106 and the second end point 112. In other words, the same randomization token establishes a commonality between what the first end point 106 transmits and what the second end point 112 transmits. As such, the network operator 205 can reverse engineer any encrypted data (e.g., the first and second communication reports) that is sent by the first end point 106 or the second end point 112 that involves the randomization token. As a result, the network operator 205 cannot remain neutral in the process flow 200a because the network operator 205 has the ability to derive the identity information. Even if the network operator 205 does not reverse engineer any encrypted data, the network operator 205 is still liable for personally identifiable information (PII) because the network operator 205 can keep the randomization token static such that that the hashed value for the same identity information will be identical.

Figure 2B:
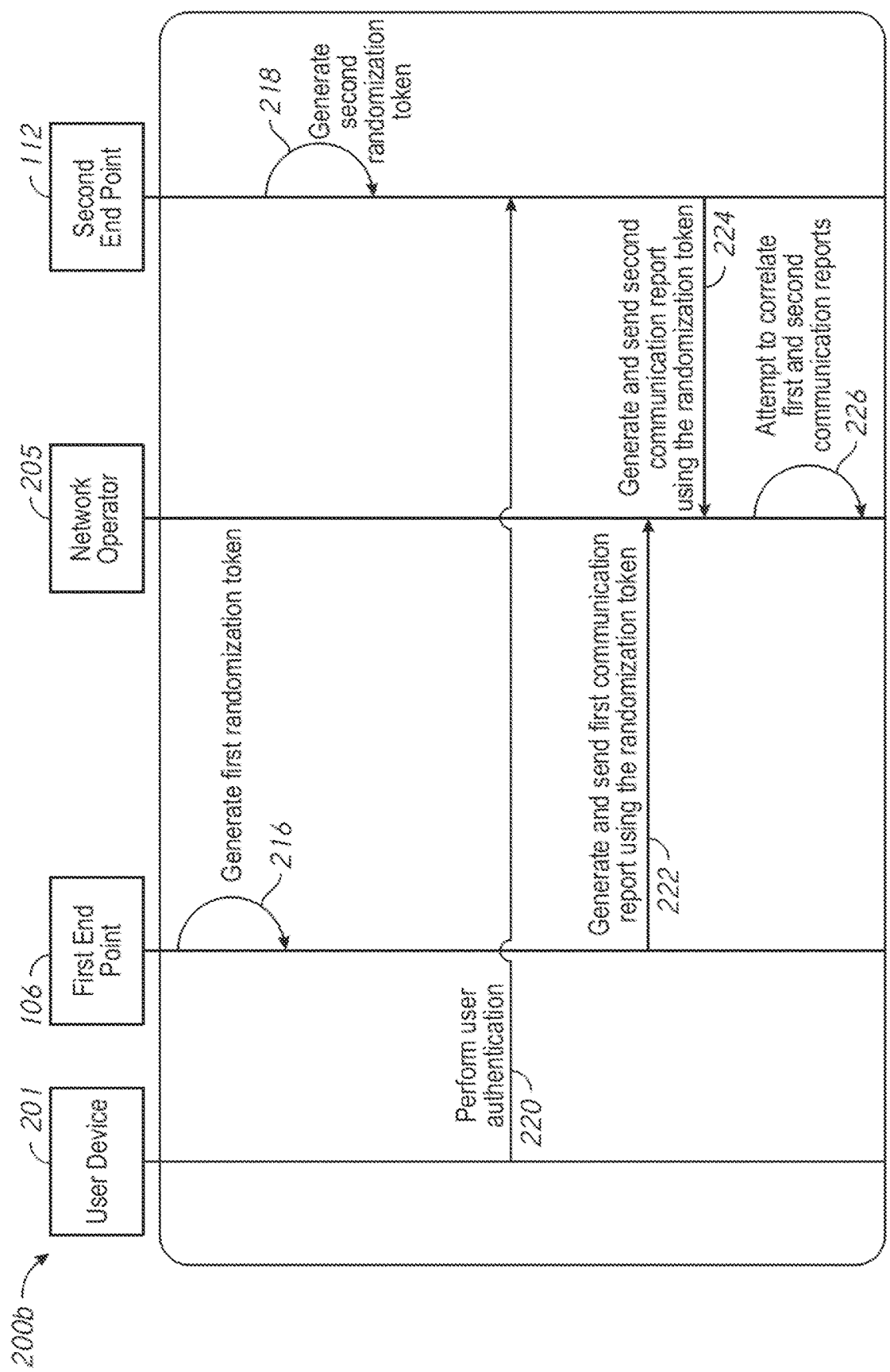
FIG. 2B is a process flow diagram that illustrates an approach for generating communication reports using uncoordinated randomization tokens in accordance with some embodiments.

FIG. 2B depicts a process flow 200b implemented by a system for generating communication reports using uncoordinated randomization tokens in accordance with some embodiments. As an option, one or more instances of the process flow 200b or any aspect thereof may be implemented in the context of the architecture and functionality of the embodiments described herein. Also, the process flow 200b or any aspect thereof may be implemented in any desired environment. In some embodiments, a user device 201, a first end point 106, a network operator 205, and a second end point 112 exhibit a set of high-level interactions (e.g., operations, messages, etc.) as shown in the process flow 200b in FIG. 2.

In contrast to the process flow 200a, the process flow 200b describes a method where the first end point 106 and the second end point 112 independently generate randomization tokens instead of the network operator 205 generating the randomization token. This allows the network operator 205 to stay "neutral" because the network operator 205 is unable to derive identity information within communication reports generated by using the randomization token.

In some embodiments, as represented by operation 216, the first end point 106 generates a first randomization token.

In some embodiments, as represented by operation 218, the second end point 112 generates a second randomization token. The second randomization token is different from the first randomization token because the second randomization token is generated by the second end point 112 rather than by the first end point 106.

In some embodiments, as represented by operation 220, the user device 201 authenticates a user identity with the second end point 112. For example, as described above with respect to the operation 208 in FIG. 2A, a user may use the user device 201 to log into his/her social media account using pre-existing login credentials, and the user is, in turn, authenticated by the social media platform (e.g., associated with the second end point 112).

In some embodiments, as represented by operation 222, the first end point 106 generates a first communication report using the first randomization token and sends the first communication report to the network operator 205. In some embodiments, the first communication report includes a first hash that corresponds to a function of the first randomization token and identity information.

In some embodiments, as represented by operation 224, the second end point generates a second communication report using the second randomization token and sends the second communication report to the network operator 205. In some embodiments, the second communication report includes a second hash that corresponds to a function of the second randomization token and identity information.

In some embodiments, as represented by operation 226, the network operator 205 attempts to correlate the first communication report and the second communication report by comparing the hashes therein. However, the network operator 205 cannot correlate the first and second communication reports because the hashes will not match due to the usage of the first and second randomization tokens, which include different values. Furthermore, the network operator 205 cannot correlate the first and second communication reports because the network operator 205 has no knowledge of the values associated with the first and second randomization tokens. As a result, unlike the operation 214 shown in FIG. 2A, there is no commonality between the first end point 106 and the second end point 112.

Figure 3:
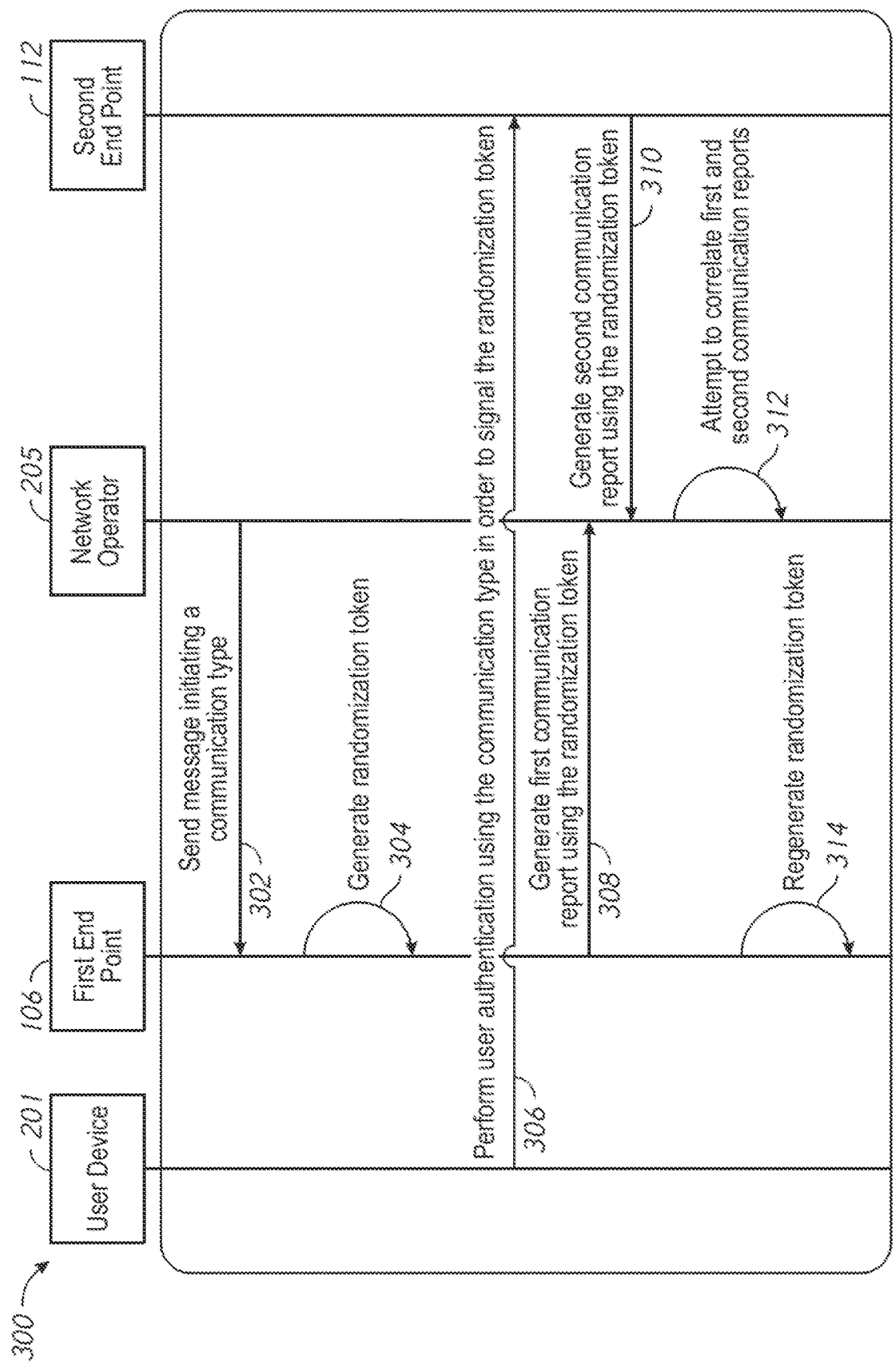
FIG. 3 is a process flow diagram that illustrates an approach for tracing end point identity information from anonymized communication reports in accordance with some embodiments.

FIG. 3 depicts a process flow 300 implemented by a system for tracing end point identity information from anonymized communication reports in accordance with some embodiments. As an option, one or more instances of the process flow 300 or any aspect thereof may be implemented in the context of the architecture and functionality of the embodiments described herein. Also, the process flow 300 or any aspect thereof may be implemented in any desired environment. In some embodiments, a user device 201, a first end point 106, a network operator 205, and a second end point 112 exhibit a set of high-level interactions (e.g., operations, messages, etc.) as shown in the process flow 300 in FIG. 3.

In contrast to the process flow 200a from FIG. 2A and the process flow 200b from FIG. 2B, the process flow 300 describes a method for concealing identity information from the network operator 205 while having an ability to trace an identity of the first end point 106 and an identity of the second end point 112 from anonymized communication reports that are independently generated using a shared randomization token.

In some embodiments, as represented by operation 302, the network operator 205 sends a message initiating a communication type to the first end point 106. In some embodiments, the communication type corresponds to a distributed reporting scheme that supports anonymous data (from the perspective of the network operator 205). In some embodiments, the network operator 205 configures the rate at which end points may refresh or generate randomization tokens in order to maintain temporal continuity.

In some embodiments, as represented by operation 304, the first end point 106 generates a randomization token.

In some embodiments, as represented by operation 306, the user device 201 performs user authentication using the communication type in order to both authenticate a user identity with the second end point 112 and also signal the randomization token to the second end point 112. Here, the first end point 106 signals the randomization token to the second end point 112 using an encrypted tunnel (e.g., the encrypted tunnel 114 shown in FIG. 1). As a result, the first end point 106 and the second end point 112 possess the same randomization token, but the network operator 205 does not possess the randomization token or any knowledge about the randomization token.

In some embodiments, as represented by operation 308, the first end point 106 generates a first communication report using the randomization token and sends the first communication report to the network operator 205. In some embodiments, the first communication report includes a first hash that corresponds to a function of the randomization token and identity information.

In some embodiments, as represented by operation 310, the second end point 112 generates a second communication report using the randomization token shared from the first end point 106 and sends the second communication report to the network operator 205. In some embodiments, the second communication report includes a second hash that corresponds to a function of the randomization token and identity information.

In some embodiments, as represented by operation 312, the network operator 205 attempts to correlate the first and second communication reports by comparing the hashes therein. The network operator 205 is able to correlate the first and second communication reports because the first and second hashes match due to the usage of the same randomization token shared between the first end point 106 and the second end point 112.

As mentioned in operation 308 and 310, the first end point 106 and the second end point 112 both used the same randomization token to generate their respective communication reports. As such, even though the communication reports were generated independently and contain anonymized data (from the perspective of the network operator 205), the network operator 205 has the ability to correlate the first end point 106 and the second end point 112 with a communication across the network by comparing hash values from the communication reports. As a result, the network operator stays "neutral" because the network operator 205 has no knowledge of the randomization token. An advantage of the network operator 205 being neutral is to obviate the need for the network operator 205 to comply with GDPR requirements.

In some embodiments, as represented by operation 314, the first end point 106 refreshes the randomization token for each new session. In some embodiments, the network operator 205 places restrictions on how often an end point can generate a randomization token in order to restrict repeated access attempts from a common identity (e.g., MAC address) to be identified by the network operator 205.

Figure 4:
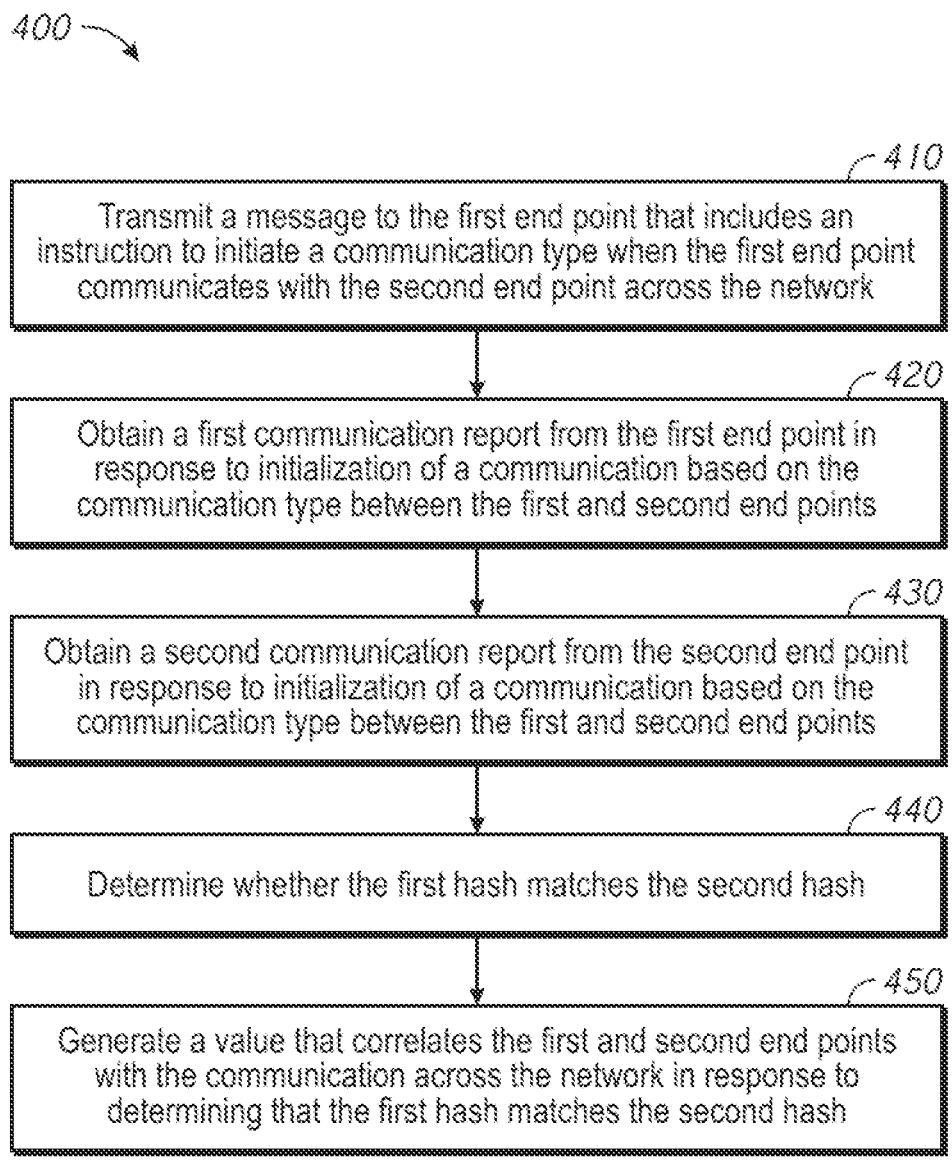
FIG. 4 is a flow representation of a method of tracing end point identity information from anonymized communication reports in accordance with some embodiments.

FIG. 4 is a flowchart representation of a method 400 of tracing end point identity information from anonymized communication reports that are independently generated using a shared anonymization token in accordance with some embodiments. In some embodiments, the method 400 is performed by a network controller (e.g., the network controller 110 shown in FIG. 1) managing network connectivity between a first end point (e.g., the first end point 106 shown in FIG. 1) and a second end point (e.g., the second end point 112 shown in FIG. 1). In some embodiments, the method 400 is performed by processing logic, including hardware, firmware, software, or a combination thereof. In some embodiments, the method 400 is performed by a processor executing code stored in non-transitory computer-readable medium (e.g., a memory). In some embodiments, a set of computer readable instructions that are executed at a device including the node implements the method 400.

In some embodiments, the first end point corresponds to an access provider (e.g., a retailer with a Wi-Fi hotspot), and the second end point corresponds to an identity provider (e.g., a social media platform, an SSO platform, or the like). For example, the network controller corresponds to a management and control function of a neutral cloud federation (e.g., the cloud federation 105 in FIG. 1) that acts as an intermediary between the first end point and the second end point. In some embodiments, the neutral cloud federation acts as a link between the first end point and the second end point but should not be involved in user equipment identification or tracking.

To that end, as represented by block 410, the method 400 includes transmitting a message to the first end point that includes an instruction to initiate a communication type when the first end point communicates with the second end point across a network associated with the network controller, wherein the communication type includes sharing a randomization token between the first end point and the second end point. In some embodiments, the communication type corresponds to a salt generation policy. In some embodiments, the randomization token corresponds to random "salt" value that acts to anonymize future hash values in communication reports. The randomization token is never shared with the network in order to maintain its neutrality.

In some embodiments, the first end point communicates with the second end point in order to initialize a communication session via an encrypted tunnel (e.g., the encrypted tunnel 114 shown in FIG. 1). For example, the communication session includes authenticating a user device attempting to connect to the second end point (e.g., an identity provider).

In some embodiments, the network operator defines a new attribute within the encrypted tunnel that will contain the randomization token. In some embodiments, the network operator may place restrictions on how often the randomization token is refreshed in order to enable repeated access attempts from a common identity to be identified by the network. In some embodiments, the network operator defines an authentication, authorization, and accounting, (AAA) attribute within an extensible authentication protocol (EAP) exchange for signaling random salt for anonymized reporting. For example, the AAA attribute may correspond to an available header or empty slot within packet(s) transported through the encrypted tunnel. As such, the randomization token is included in a data packet sent through the encrypted tunnel as an AAA attribute that is sent to the second end point. In some embodiments, the network operator uses a combination of dynamic domain name system (DNS) roaming such that the network operator is not involved in proxying the AAA attribute.

To that end, as represented by block 420, the method 400 includes obtaining a first communication report from the first end point in response to initialization of a communication based on the communication type between the first end point and second end point across the network associated with the network controller, wherein the first communication report includes a first hash that corresponds to a function of the randomization token and identity information. In some embodiments, the first and second communication reports correspond to federated ticker system (F-TICKs) identity logs that include a hash value that is a function of the randomization token (e.g., a shared salt value) and identity information (e.g., MAC address or IP address of the user device, location of the access provider or the user device, or the like). The F-TICKs identity log is a syslog-like report corresponding to feedback after a message is sent.

To that end, as represented by block 430, the method includes obtaining a second communication report from the second end point in response to the initialization of the communication based on the communication type between the first end point and second end point across the network associated with the network controller, wherein the second communication report includes a second hash that corresponds to the function of the randomization token and the identity information From the perspective of the network operator, the first and second communication reports include anonymous data, which enables the network operator to comply with the GDPR. Furthermore, the network operator is unable to access data associated with the encrypted tunnel. As such, the network operator is unable to derive the identity information from the hash values within the communication reports because the network operator has no knowledge of the value associated with the randomization token.

To that end, as represented by block 440, the method includes determining whether the first hash matches the second hash.

To that end, as represented by block 450, the method includes generating a value that correlates the first end point and second end point with the communication across the network in response to determining that the first hash matches the second hash. The network operator does not have any knowledge of the randomization token. As a result of the communication type, user anonymity is maintained because, without knowledge of the randomization token, the network operator cannot reverse engineer the hash where the hash is a function of identity information associated with the user and the randomization token. However, the network operator is also able to keep a record of communication sessions between end points across its network while maintaining anonymity for associated users.

In some embodiments, the network operator maintains a session correlation matrix containing entries that correlate a first end point and a second end point with a communication session across a network. For example, each entry also includes a timestamp and other information such as bandwidth consumed and/or the like.

Figure 5:
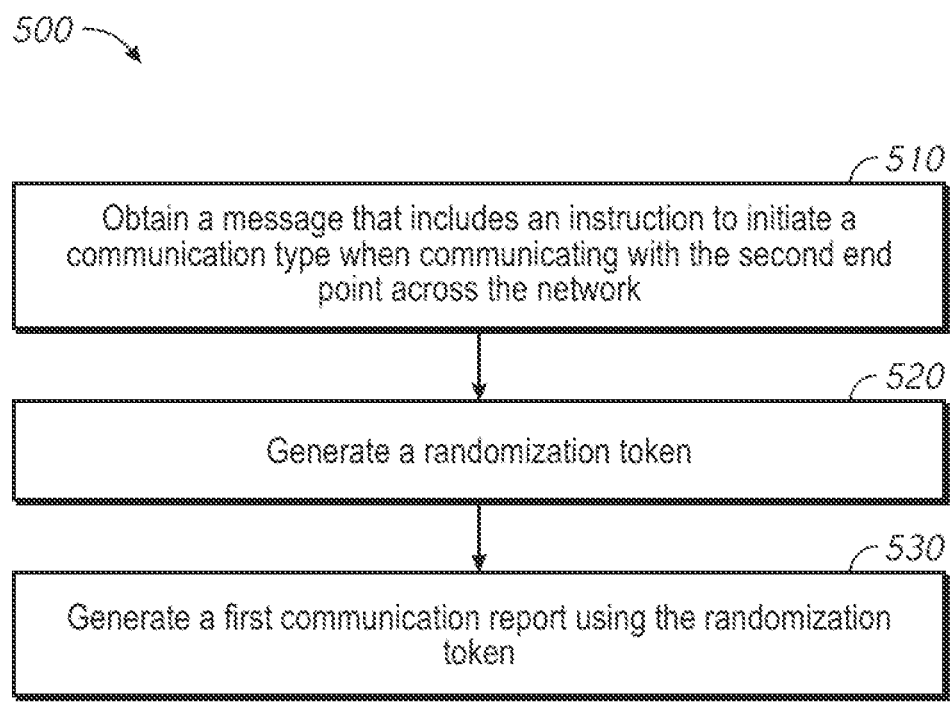
FIG. 5 is a flow representation of a method of generating anonymized communication reports using a shared randomization token in accordance with some embodiments.

FIG. 5 is a flowchart representation of a method 500 of generating anonymized communication reports using a shared randomization token in accordance with some embodiments. In some embodiments, the method 500 is performed by a first end point (e.g., the first end point 106 shown in FIG. 1) or a second end point (e.g., the second end point 112 shown in FIG. 1). In some embodiments, the method 500 is performed by processing logic, including hardware, firmware, software, or a combination thereof. In some embodiments, the method 500 is performed by a processor executing code stored in non-transitory computer-readable medium (e.g., a memory). In some embodiments, a set of computer readable instructions that are executed at a device including the node implements the method 500.

To that end, as represented by block 510, the method 500 includes obtaining a message, from a network controller, that includes an instruction to initiate a communication type when communicating with the second end point across a network associated with the network controller.

To that end, as represented by block 520, the method 500 includes generating a randomization token. In some embodiments, the randomization token is generated according to a specific technique such as a particular random or pseudo-random number generator or a number generator based on specified seed data such as cosmic noise, radiation decay, thermal noise, shot noise, or the like.

To that end, as represented by block 530, the method 500 includes generating a first communication report using the randomization token. In some embodiments, the first communication report includes only minimal information needed in order to generate statistics. In some embodiments, the first communication report is sent with syslog information to the network controller. In some embodiments, a master communication report includes a plurality of communication reports for different communication sessions.

Figure 6:
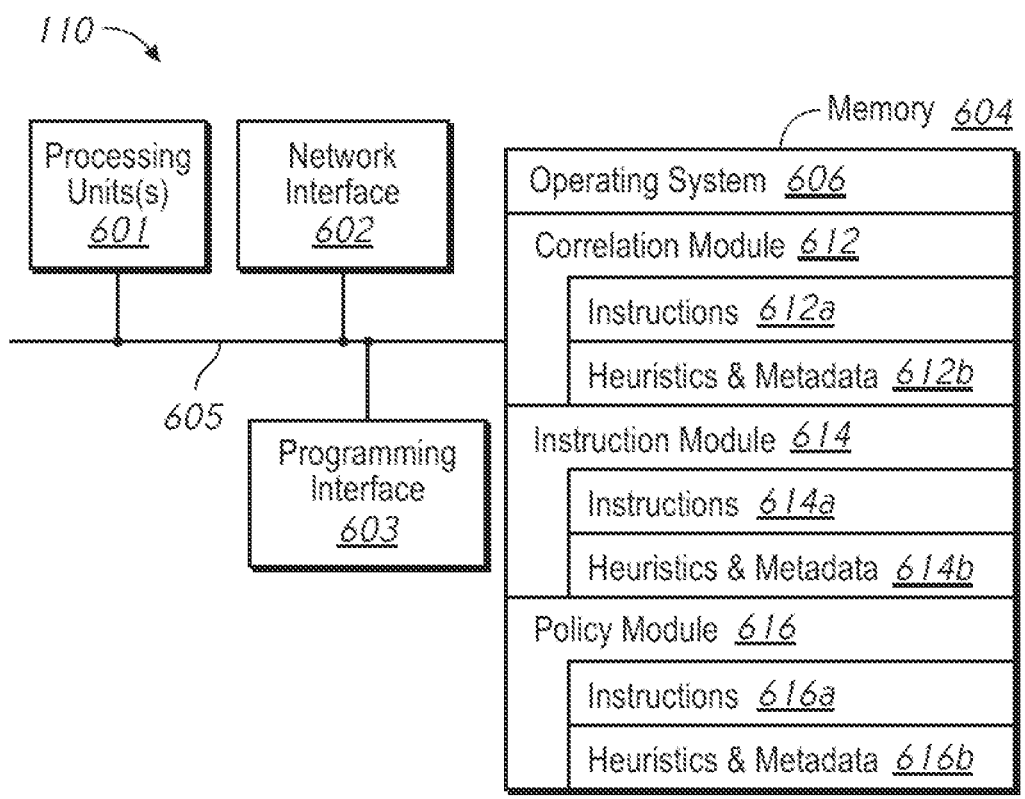
FIG. 6 is a schematic block diagram of an example network controller in accordance with some embodiments.

FIG. 6 is a block diagram of a network controller 110 enabled with one or more components of a device in accordance with some embodiments. While certain specific features are illustrated, those of ordinary skill in the art will appreciate from the present disclosure that various other features have not been illustrated for the sake of brevity, and so as not to obscure more pertinent aspects of the embodiments disclosed herein. To that end, as a non-limiting example, in some embodiments the network controller 110 includes one or more processing units 601 (e.g., one or more central processing units (CPUs), graphics processing units (GPUs), application specific integrated circuits (ASICs), field-programmable gate arrays (FPGAs), processing cores, or the like), a network interface 602, a programming interface 603, a memory 604, and one or more communication buses 605 for interconnecting these and various other components.

In some embodiments, the one or more communication buses 605 include circuitry that interconnects and controls communications between system components. The memory 604 includes high-speed random-access memory, such as DRAM, SRAM, DDR, RAM, or other random-access solid-state memory devices, and may include non-volatile memory, such as one or more magnetic disk storage devices, optical disk storage devices, flash memory devices, or other non-volatile solid-state storage devices. The memory 604 optionally includes one or more storage devices remotely located from the one or more processing units 601. The memory 604 comprises a non-transitory computer readable storage medium.

In some embodiments, the memory 604 or the non-transitory computer readable storage medium of the memory 604 stores the following programs, modules, and data structures, or a subset thereof including an optional operating system 606, a correlation module 612, an instruction module 614, and a policy module 616. The operating system 606 includes procedures for handling various basic system services and for performing hardware dependent tasks.

In some embodiments, the correlation module 612 is configured to determine whether a first hash value matches a second hash value. In some embodiments, the correlation module 612 also generates a value that correlates the first end point 106 and the second end point 112 with a communication across a network. To that end, in various embodiments, the correlation module 612 includes a set of instructions and/or logic 612a, and heuristics and metadata 612b.

In some embodiments, the instruction module 614 is configured to send instructions for initiating a security scheme associated with a communication type when a first end point communicates with a second end point across the network associated with the network controller 110. To that end, in various embodiments, the instruction module 614 includes a set of instructions and/or logic 614a, and heuristics and metadata 614b.

In some embodiments, the policy module 616 is configured to configure the communication type in order to place restrictions on how often a randomization token is refreshed and store configuration information for the communication type. To that end, in various embodiments, the policy module 616 includes a set of instructions and/or logic 616a, and heuristics and metadata 616b.

Although the correlation module 612, the instruction module 614, and the policy module 616 are illustrated as residing on a network controller 110, it should be understood that in other embodiments, any combination of the correlation module 612, the instruction module 614, and the policy module 616 may reside on a separate computing device.

Moreover, FIG. 6 is intended more as functional description of the various features which may be present in a particular embodiment as opposed to a structural schematic of the embodiments described herein. As recognized by those of ordinary skill in the art, items shown separately could be combined and some items could be separated. For example, some functional modules shown separately in FIG. 6 could be implemented in a single module and the various functions of single functional blocks could be implemented by one or more functional blocks in various embodiments. The actual number of modules and the division of particular functions and how features are allocated among them will vary from one embodiment to another and, in some embodiments, may depend in part on the particular combination of hardware, software, and/or firmware chosen for a particular embodiment.

Various aspects of embodiments within the scope of the appended claims are described above. It should be apparent that the various features of embodiments described above may be embodied in a wide variety of forms and that any specific structure and/or function described above is merely illustrative. Based on the present disclosure, one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first communication report could be termed a second communication report, and, similarly, a second communication report could be termed a first communication report, without changing the meaning of the description, so long as all occurrences of the "first communication report" are renamed consistently and all occurrences of the "second communication report" are renamed consistently. The first communication report and the second communication report are both communication report, but they are not the same communication report.

The terminology used herein is for the purpose of describing particular embodiments only and is not intended to be limiting of the claims. As used in the description of the embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   obtaining, by a controller, a first communication report from a first end point based on initialization of a session for a user device associated with communications between the first end point and a second end point, wherein the first communication report includes a first hash that corresponds to a function of a randomization token and identity information;

obtaining, by the controller, a second communication report from the second end point based on the initialization of the session for the user device, wherein the second communication report includes a second hash that corresponds to a function of the randomization token and the identity information;

determining whether the first hash matches the second hash; and generating a value that correlates the first end point and the second end point with the session for the user device in response to determining that the first hash matches the second hash.

2. The method of claim 1, further comprising:

prior to obtaining the first communication report from the first end point, transmitting a message to the first end point that includes an instruction to initiate a communication type when the first end point communicates with the second end point.

3. The method of claim 1, wherein the randomization token is generated by the first end point.

4. The method of claim 1, further comprising:

instructing the first end point to refresh the randomization token for a new user device session.

5. The method of claim 1, wherein generating the value includes generating an entry in a session correlation matrix that correlates the first end point and the second end point with the session for the user device.

6. The method of claim 1, wherein the first end point corresponds to an access provider.

7. The method of claim 1, wherein the second end point corresponds to an identity provider.

8. The method of claim 1, wherein the identity information corresponds to at least one of a Media Access Control (MAC) address, an Internet Protocol (IP) address, and a location associated with the user device.

9. The method of claim 1, wherein the first communication report and the second communication report correspond to a Federated Ticker System (F-TICKs) report.

10. A device comprising:
one or more processors;
a non-transitory memory; and
one or more programs stored in the non-transitory memory, which, when executed by the one or more processors, cause the device to:
obtain a first communication report from a first end point based on initialization of a session for a user device associated with communications between the first end point and a second end point, wherein the first communication report includes a first hash that corresponds to a function of a randomization token and identity information;
obtain a second communication report from the second end point based on the initialization of the session for the user device, wherein the second communication report includes a second hash that corresponds to a function of the randomization token and the identity information;
determine whether the first hash matches the second hash; and
generate a value that correlates the first end point and the second end point with the session for the user device in response to determining that the first hash matches the second hash.

11. The device of claim 10, wherein the one or more programs, when executed by the one or more processors, cause the device to:

prior to obtaining the first communication report from the first end point, transmit a message to the first end point that includes an instruction to initiate a communication type when the first end point communicates with the second end point.

12. The device of claim 10, wherein the one or more programs, when executed by the one or more processors, cause the device to:

instruct the first end point to refresh the randomization token for a new user device session.

13. The device of claim 10, wherein to generate the value includes to generate an entry in a session correlation matrix that correlates the first end point and the second end point with the session for the user device.

14. The device of claim 10, wherein the identity information corresponds to at least one of a Media Access Control (MAC) address, an Internet Protocol (IP) address, and a location associated with the user device.

15. A non-transitory memory storing one or more programs, the one or more programs comprising instructions, which, when executed by one or more processors of a device, cause the device to:
obtain a first communication report from a first end point based on initialization of a session for a user device associated with communications between the first end point and a second end point, wherein the first communication report includes a first hash that corresponds to a function of a randomization token and identity information;
obtain a second communication report from the second end point based on the initialization of the session for the user device, wherein the second communication report includes a second hash that corresponds to a function of the randomization token and the identity information;
determine whether the first hash matches the second hash; and
generate a value that correlates the first end point and the second end point with the session for the user device in response to determining that the first hash matches the second hash.

16. The non-transitory memory of claim 15, wherein the one or more programs further comprise instructions, which, when executed by the one or more processors of the device, cause the device to:

prior to obtaining the first communication report from the first end point, transmit a message to the first end point that includes an instruction to initiate a communication type when the first end point communicates with the second end point.

17. The non-transitory memory of claim 15, wherein the one or more programs further comprise instructions, which, when executed by the one or more processors of the device, cause the device to:

instruct the first end point to refresh the randomization token for a new user device session.

18. The non-transitory memory of claim 15, wherein to generate the value includes to generate an entry in a session correlation matrix that correlates the first end point and the second end point with the session for the user device.

19. The non-transitory memory of claim 15, wherein the identity information corresponds to at least one of a Media Access Control (MAC) address, an Internet Protocol (IP) address, and a location associated with the user device.

20. The non-transitory memory of claim 15, wherein the first communication report and the second communication report correspond to a Federated Ticker System (F-TICKs) report.

\* \* \* \* \*